(12) United States Patent
Ogawa

(10) Patent No.: US 10,565,412 B2
(45) Date of Patent: Feb. 18, 2020

(54) BARCODE READING DEVICE, IMAGING METHOD AND COMPUTER-READABLE STORAGE MEDIUM

(71) Applicant: CASIO COMPUTER CO., LTD., Shibuya-ku, Tokyo (JP)

(72) Inventor: Yasuaki Ogawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/129,750

(22) Filed: Sep. 12, 2018

(65) Prior Publication Data
US 2019/0080125 A1    Mar. 14, 2019

(30) Foreign Application Priority Data

Sep. 13, 2017 (JP) .................................. 2017-175465

(51) Int. Cl.
*G06K 7/10* (2006.01)
*G06K 7/14* (2006.01)
(Continued)

(52) U.S. Cl.
CPC ....... *G06K 7/10722* (2013.01); *G06K 7/1413* (2013.01); *G06K 9/2027* (2013.01); *G06K 9/228* (2013.01)

(58) Field of Classification Search
CPC ... G06K 7/10722; G06K 7/10772; G06K 7/14
(Continued)

(56) References Cited

U.S. PATENT DOCUMENTS 5,414,251 A    5/1995  Durbin
9,633,245 B2   4/2017  Kawashima et al.
(Continued)

FOREIGN PATENT DOCUMENTS

JP    H11345278 A    12/1999
JP    2000322505 A   11/2000
(Continued)

OTHER PUBLICATIONS

Related U.S. Appl. No. 16/051,636; First Named Inventor: Teppei Moriyama; Title: "Barcode Reading Device, Control Method and Computer-Readable Storage Medium"; filed Aug. 1, 2018.
(Continued)

*Primary Examiner* — Edwyn Labaze
(74) *Attorney, Agent, or Firm* — Holtz, Holtz & Volek PC

(57) ABSTRACT

A barcode reading device including a scanner which irradiates a target with a light beam and scans a barcode provided on the target so as to read information from the barcode, a camera which captures images of the target, a display which displays the images captured by the camera, and a processor which performs processing operations including an imaging control processing operation for, when the scanner is irradiating the target with the light beam, controlling the camera to perform an imaging operation for acquiring an image for recording, at predetermined imaging timing, and an irradiation control processing operation for temporarily stopping the light beam irradiation by the scanner in synchronization with the imaging timing.

9 Claims, 9 Drawing Sheets

(51) Int. Cl.
*G06K 9/22* (2006.01)
*G06K 9/20* (2006.01)

(58) Field of Classification Search
USPC .... 235/462.41, 462.01, 462.11, 462.24, 375, 235/454
See application file for complete search history.

(56) References Cited

U.S. PATENT DOCUMENTS

| | | | |
|---|---|---|---|
| 2012/0199655 A1* | 8/2012 | Fukuba | G02B 3/14 |
| | | | 235/455 |
| 2012/0248184 A1* | 10/2012 | Naito | G06K 7/10732 |
| | | | 235/383 |
| 2013/0329123 A1* | 12/2013 | Hakata | G02B 7/09 |
| | | | 348/345 |
| 2018/0086266 A1 | 3/2018 | Yamaguchi et al. | |

FOREIGN PATENT DOCUMENTS

| | | |
|---|---|---|
| JP | 2004345826 A | 12/2004 |
| JP | 2005275530 A | 10/2005 |
| JP | 2007207010 A | 8/2007 |
| JP | 2011101075 A | 5/2011 |
| JP | 2014127105 A | 7/2014 |
| WO | 2016190437 A1 | 12/2016 |

OTHER PUBLICATIONS

Japanese Office Action dated Sep. 4, 2019 (and English translation thereof) issued in Japanese Patent Application No. JP 2017-175465.
Japanese Office Action dated Dec. 25, 2019 (and English translation thereof) issued in Japanese Patent Application No. 2017-175465.

* cited by examiner

BARCODE READING DEVICE, IMAGING METHOD AND COMPUTER-READABLE STORAGE MEDIUM

CROSS-REFERENCE TO RELATED APPLICATION

This application is based upon and claims the benefit of priority from the prior Japanese Patent Application No. 2017-175465 filed Sep. 13, 2017, the entire contents of which are incorporated herein by reference.

BACKGROUND OF THE INVENTION

1. Field of the Invention

The present invention relates to a barcode reading device, an imaging method and a computer-readable storage medium for use in management tasks for articles, ledger documents, and the like.

2. Description of the Related Art

Conventionally, in management tasks for the warehousing and delivery, inventory and the like of articles such as commodities, for example, handy terminals for reading barcodes provided to the articles by a laser scanner have been often used, and a handy terminal having a digital camera in its main body is known (for example, refer to Japanese Patent Application Laid-Open (Kokai) Publication No. 2004-345826). With this handy terminal equipped with a digital, for example, images showing a state as to whether articles have been damaged at the time of warehousing and delivery, images showing ledger documents such as receipts, sales slips, invoices with barcodes written thereon and the like can be acquired as captured images for management.

SUMMARY OF THE INVENTION

In accordance with one embodiment, there is provided a barcode reading device comprising: a scanner which irradiates a target with a light beam and thereby scans a barcode provided on the target so as to read information from the barcode; a camera which captures images of the target; a display which displays the images captured by the camera; and a processor which performs processing operations including: an imaging control processing operation for, when the scanner is irradiating the target with the light beam, controlling the camera to perform an imaging operation for acquiring an image for recording at predetermined imaging timing, and an irradiation control processing operation for temporarily stopping the light beam irradiation by the scanner in synchronization with the imaging timing.

In accordance with another embodiment, there is provided an imaging method of photographing a target for a barcode reading device including a scanner which irradiates the target with a light beam and thereby scans a barcode provided on the target so as to read information from the barcode, a camera which captures images of the target, a display which displays the images captured by the camera, and a processor, comprising: an imaging control step of, when the scanner is irradiating the target with the light beam, controlling the camera to perform an imaging operation for acquiring an image for recording at predetermined imaging timing; and an irradiation control step of temporarily stopping the light beam irradiation by the scanner in synchronization with the imaging timing.

In accordance with another embodiment, there is provided a non-transitory computer-readable storage medium having stored thereon a program that is executable by a computer of a barcode reading device including a scanner which irradiates a target with a light beam and thereby scans a barcode provided on the target so as to read information from the barcode, a camera which captures images of the target, a display which displays the images captured by the camera, and a processor, the program being executable by the computer to perform processing operations including: an imaging control processing operation for, when the scanner is irradiating the target with the light beam, controlling the camera to perform an imaging operation for acquiring an image for recording at predetermined imaging timing, and an irradiation control processing operation for temporarily stopping the light beam irradiation by the scanner in synchronization with the imaging timing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
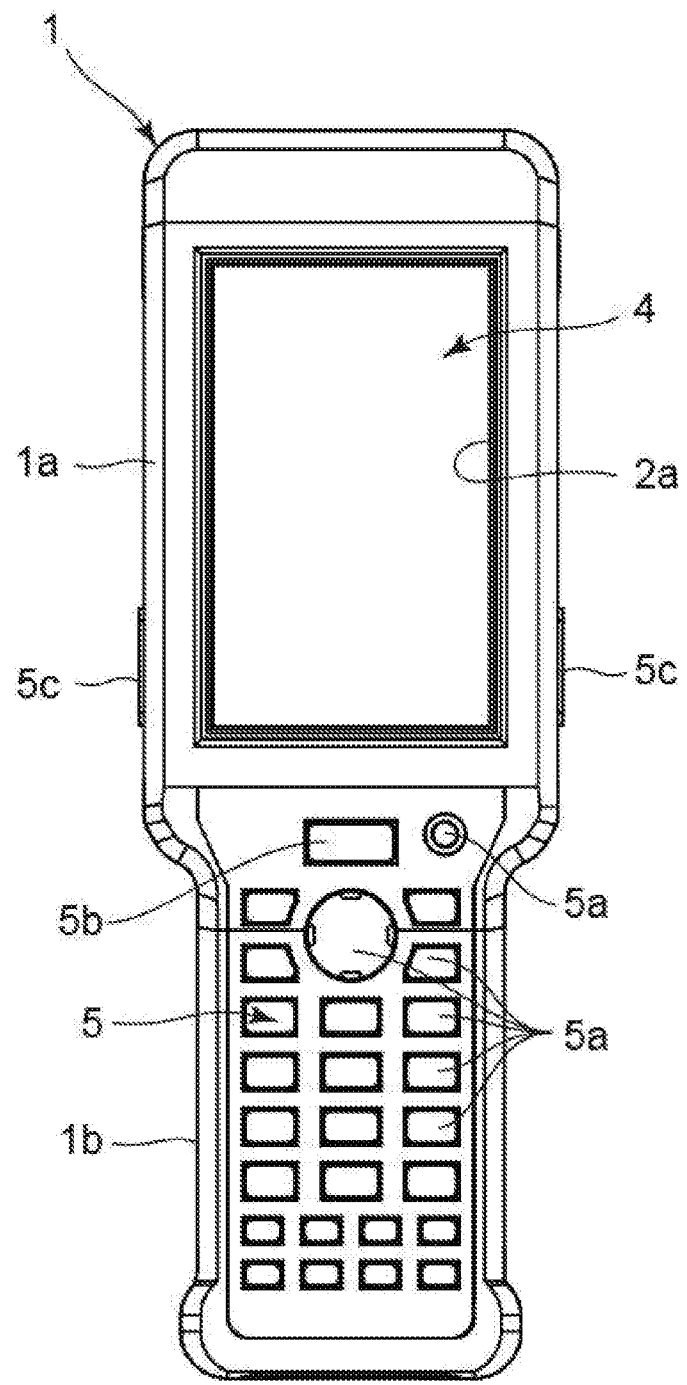
FIG. 1 is a front view of an embodiment of a handy terminal according to the present invention.
Figure 2:
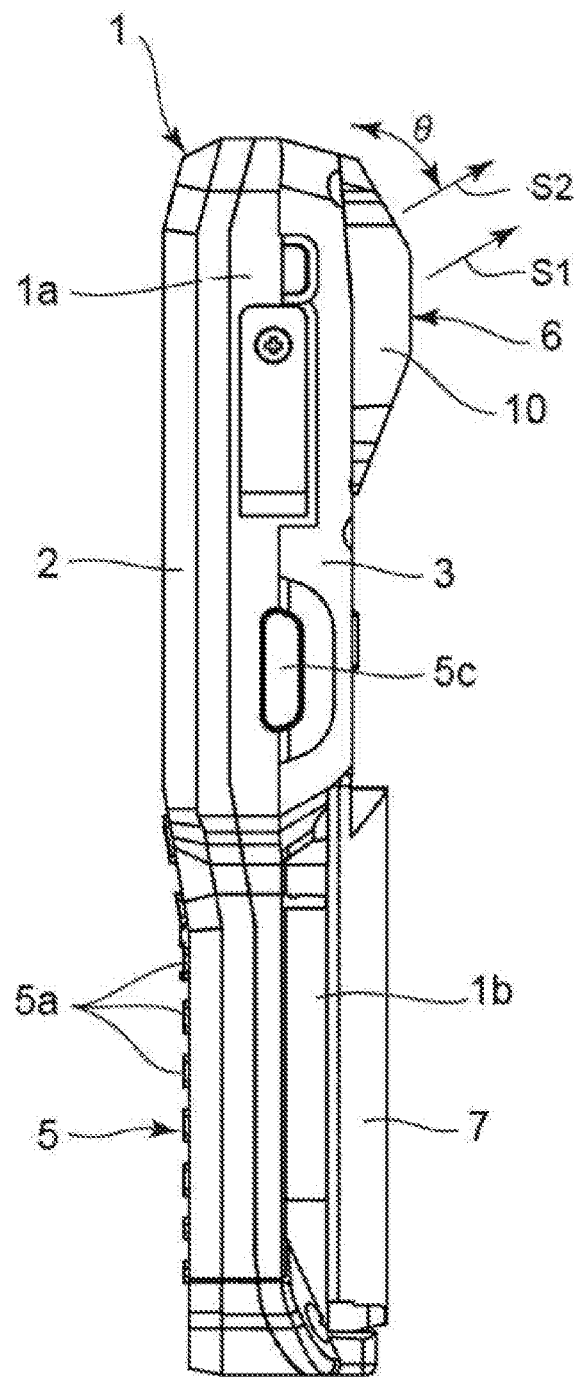
FIG. 2 is a side view of the handy terminal.
Figure 3:
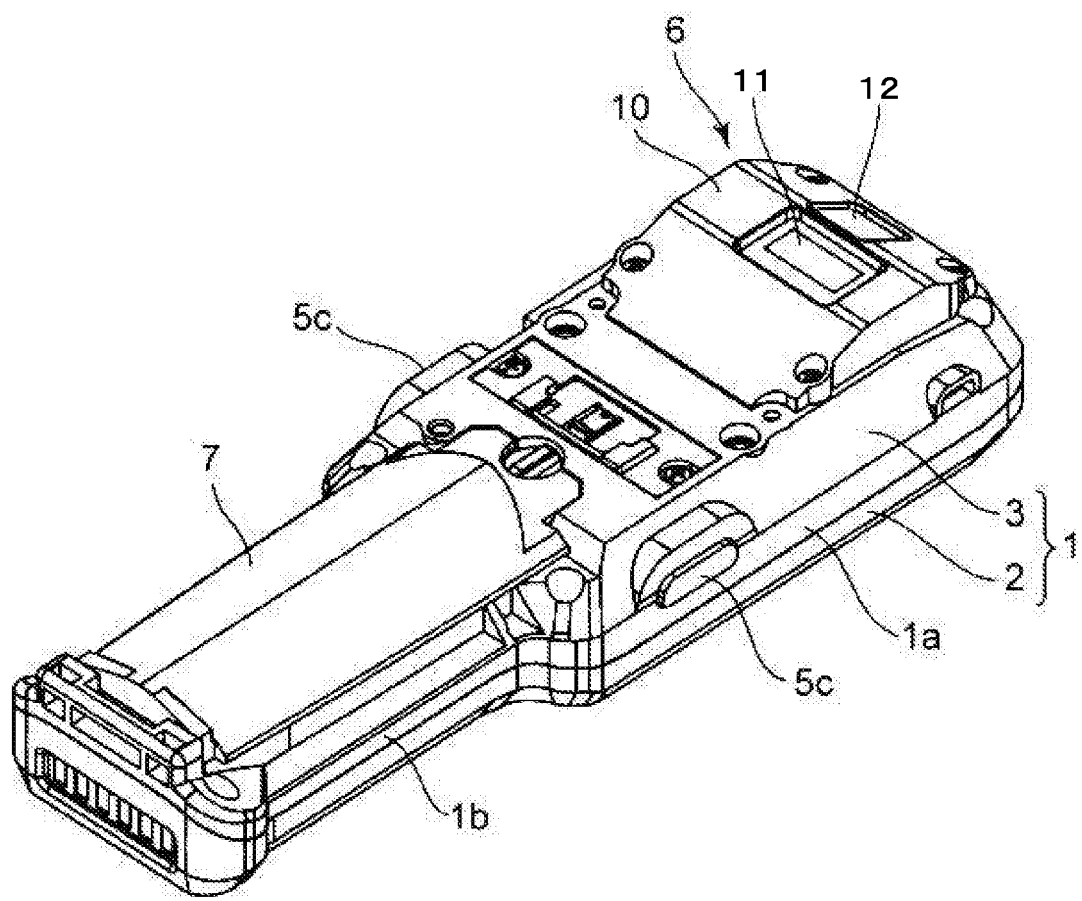
FIG. 3 is a perspective view of the rear surface side of the handy terminal.

An embodiment of the present invention will hereinafter be described. FIG. 1 to FIG. 3 show a handy terminal according to an embodiment of the present invention.

This handy terminal includes an imaging function of capturing an image of a target such as various sales slips and articles provided with a barcode, and includes a device case 1, as shown in FIG. 1 to FIG. 3. This device case 1 is constituted by an upper case 2 and a lower case 3. The upper case 2 is provided with a display 4 and an input section 5. The lower case 3 is provided with a reading device 6 and a battery cover 7.

In the device case 1, a main body section 1*a* in a rectangular shape elongated in a front-and-back direction (vertical direction in FIG. 1) is formed on a tip side (upper side in FIG. 1) positioned on the display 4 side of the upper case 2 and its corresponding reading device 6 side of the lower case 3, a grip section 1*b* in a rectangular shape elongated in the front-and-back direction is formed on the frontward side (lower side in FIG. 1) positioned on the input section 5 side of the upper case 2 and its corresponding battery cover 7 side of the lower case 3. Also, in the device case 1, the width of the grip section 1b is narrower than the width of the main body section 1a, and the device case 1 is formed in a substantially Japanese battledore shape as a whole.

As shown in FIG. 1, the input section 5 includes various keys 5a such as numeric keys, arithmetic keys, cursor keys, an enter key, and a power supply key, which are arrayed on the upper case 2 positioned on the grip section 1b side. On the upper side of the input section 5, a center trigger key 5b is provided. On both side surfaces of the device case 1, side trigger keys 5c are provided.

The reading device 6 is constituted by a scanner and a camera provided inside a unit case 10 provided on the lower surface (upper surface in FIG. 3) of the lower case 3 corresponding to the rear surface side of the display 4. The unit case 10 is provided with a read window section 11 corresponding to the scanner and an imaging window section 12 corresponding to the camera.

The scanner of the reading device 6 is a general device which irradiates a target with laser light via the read window section 11, reads a barcode by receiving reflected light of the laser light while moving its irradiation position to a predetermined direction in a reciprocating manner, and acquires code data. The camera of the reading device 6 captures an image of the target by an image sensor via the imaging window section 12, and the image of the target or the like captured by the camera is displayed on the display 4.

Here, the handy terminal is structured such that an irradiation direction S1 of laser light and an imaging direction S2 of the camera in the reading device 6 are set to be in the same direction as shown in FIG. 2 and the light trail of the laser light reciprocating at the time of barcode reading traverses an imaging range of the camera at a predetermined position.

Figure 4:
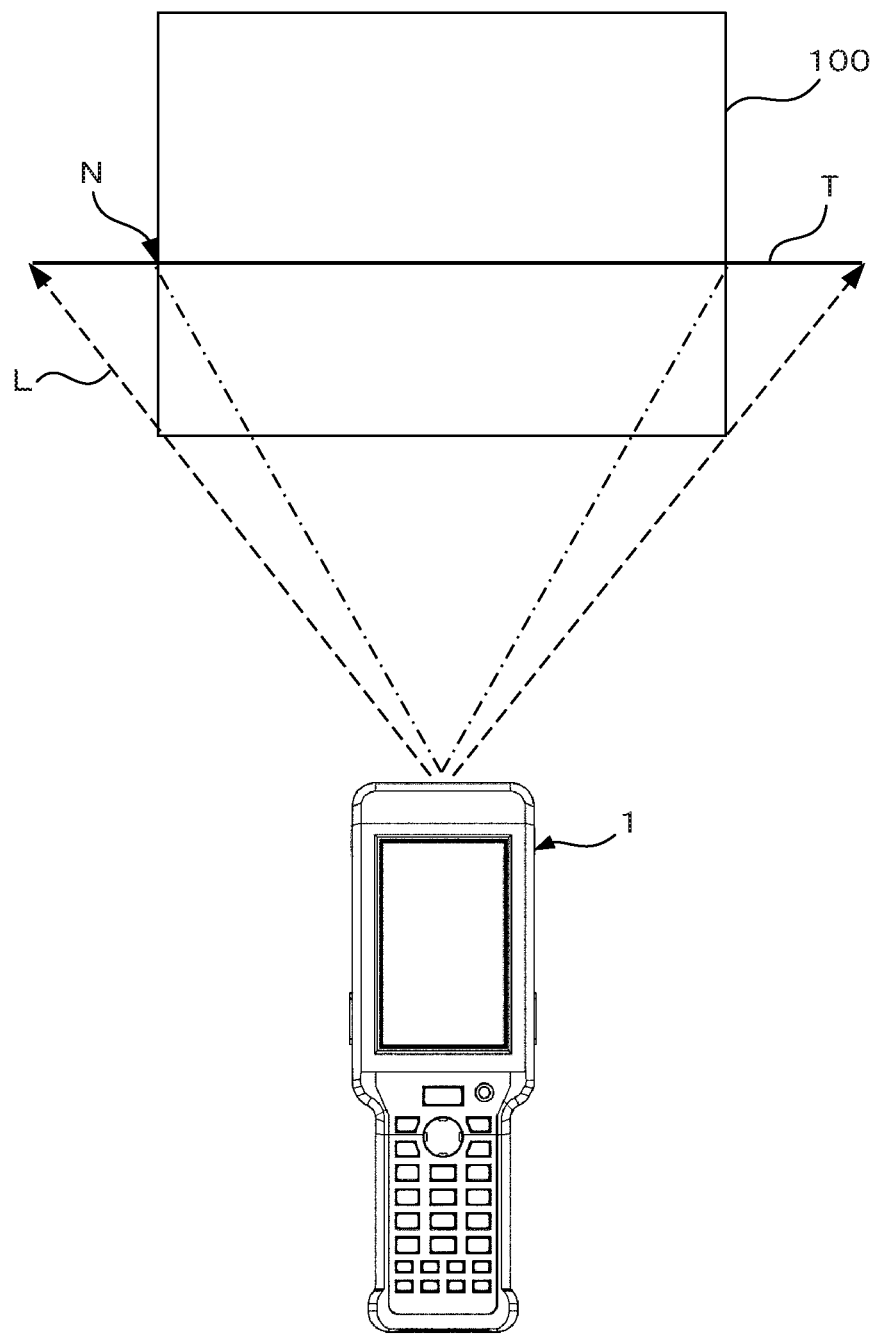
FIG. 4 is a diagram of a relation between the light trail of laser light and the imaging range of a camera at the time of barcode reading.

FIG. 4 is a diagram of a relation between the light trail T of laser light L and the imaging range 100 of the camera at the time of barcode reading. In the present embodiment, the imaging range 100 of the camera is in a longitudinally-elongated rectangular shape, the moving direction of the laser light L is a lateral direction, and its light trail T crosses the imaging range 100 at a position slightly lower than the center of the imaging range 100. Also, a crossing position N of the light trail T, that is, the position in the imaging range 100 in the vertical direction is constant.

Also, the irradiation direction S1 of the laser light L and the imaging direction S2 of the camera keep a gradient at a predetermined angle θ with respect to the lower surface of the device case 1, that is, the lower surface of the lower case 3. The handy terminal is structured such that a user (worker) can easily perform a barcode reading operation and a target imaging operation while viewing the display 4. The predetermined angle θ is in an angle range of 40 degrees to 80 degrees, and should preferably be at 60 degrees toward the tip side (upper side in FIG. 2) of the lower case 3.

Figure 5:
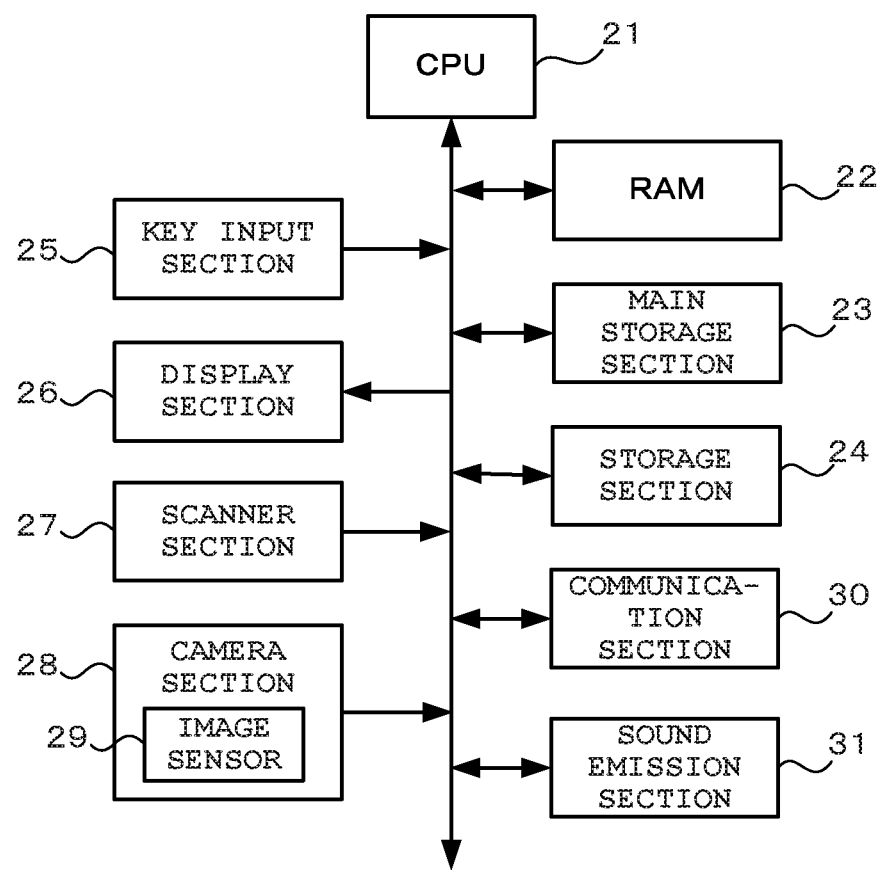
FIG. 5 is a block diagram of an electrical structure of the handy terminal.

FIG. 5 is a schematic block diagram of an electrical structure of the handy terminal. The handy terminal is constituted by a CPU (Central Processing Unit) 21, a RAM (Random Access Memory) 22 connected to the CPU 21, a main storage section 23, a storage section 24, a key input section 25, a display section 26, a scanner section 27, a camera section 28, a communication section 30, and a sound emission section 31.

The main storage section 23 is constituted by a non-volatile rewritable memory such as a flash memory incorporated in the handy terminal. The main storage section 23 stores a control program, various setting information regarding operations of the handy terminal set by the user, and the like.

The CPU 21 reads the control program from the main storage section 23, develops the control program on the RAM 22, and controls operations of the handy terminal based on the developed control program. Here, the RAM 22 is used as a work memory, and various data including image data are stored in the RAM 22 as required.

The key input section 25, which includes various keys 5a (such as numeric keys, arithmetic keys, cursor keys, enter key, and power supply key), the center trigger key 5b, and the side trigger keys 5c, detects whether these keys have been operated and supplies such operation information to the CPU 21. The display section 26 is constituted by the display 4 and its drive circuit. This display 4 is, for example, an LCD (Liquid Crystal Display) or ELD (Electro Luminescent Display).

The scanner section 27 is a laser scanner module or the like accommodated in the above-described reading device 6, and includes a laser diode (light source) which emits laser light L, a movable mirror which reflects the laser light L and scans a barcode on the surface of an article by rotating within predetermined angles, and a light-emitting element which receives irregular reflected light from the surface of the article. The scanner section 27 includes a laser control circuit which controls the light emission of the laser diode, a mirror drive circuit which drives the movable mirror, an analog signal processing circuit which processes an analog signal outputted from the light-receiving element for A/D conversion, and a decode circuit which decodes a processed digital signal to acquire code data and supplies the code data to the CPU 21. Note that the number of times of scanning with laser light is 100/second to several hundreds/second.

The camera section 28 is a digital camera module or the like accommodated in the above-described reading device 6, and includes an image sensor 29 which images a subject via an imaging lens containing a focus lens. The image sensor 29 is a CCD (Charge Coupled Device) or CMOS (Complementary Metal Oxide Semiconductor) sensor.

Although not shown, the camera section 28 includes a drive circuit which drives the image sensor 29, an image processing circuit which processes an imaging signal read from the image sensor 29, performs various signal processing such as white balance and brightness adjustment, and supplies the result as image data to the CPU 21, and an AF drive circuit which achieves an AF (Auto Focus) function by driving the imaging lens and performing focus adjustment.

Also, charge storage and signal reading of each pixel in the image sensor 29 are performed based on a timing signal from the drive circuit by following an instruction from the CPU 21, and the image sensor 29 thereby operates as an electronic shutter. In the present embodiment, the electronic shutter in the image sensor 29 is based on a rolling shutter method in which exposure starts sequentially for each horizontal line (hereinafter referred to as "line") in a pixel array and stored charges are sequentially read for each line.

Figure 6:
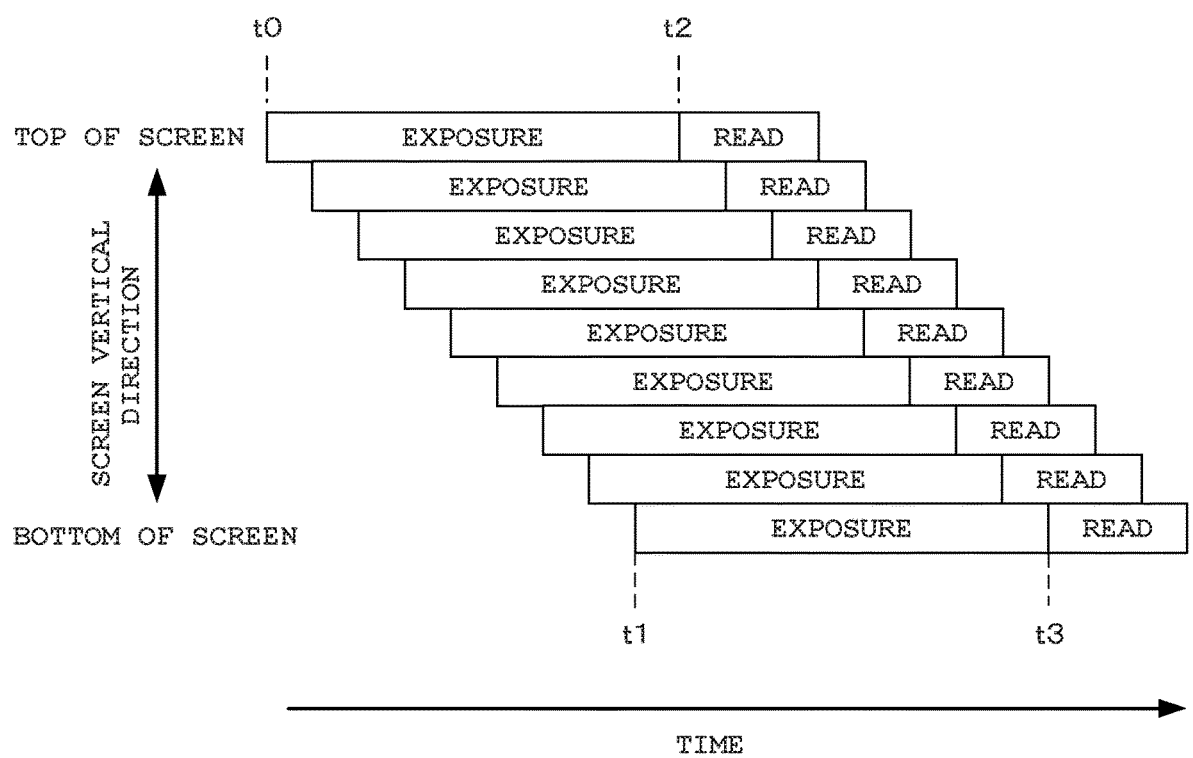
FIG. 6 is a diagram for describing an exposure period in a rolling shutter method.

FIG. 6 is a diagram for describing an exposure period and a charge transfer period for each line in the rolling shutter method. In the rolling shutter method, the exposure period has a different start time and a different end time for each line. While exposure times are t0 to t2 on the head line in the uppermost part of the screen, exposure times are t1 to t3 on the last line in the lowermost part of the screen. Also, a period t0 to t3 from when exposure of the head line is started until when exposure of the last line is ended corresponds to exposure times at the time of image capturing.

The storage section 24 is constituted by, for example, a memory card attachable to and detachable from the handy terminal and a card interface capable of inputting and outputting data to the memory card. The storage section 24 stores code data acquired by the scanner section 27 and image data generated by the CPU 21 by later-described processing based on image data acquired by the camera section 28 in a manner that the code data and the image data are associated with each other, together with other information.

The communication section 30 communicates with an external information device as required wirelessly or in a wired manner, and transmits code data and image data for each article stored (saved) in the storage section 24 and code data and image data newly acquired during an operation and temporarily stored in the RAM 22 to the external information device. The external information device is, for example, a computer or a data management server for use in management tasks such as those regarding article delivery or inventory.

The sound emission section 31 is constituted by a sound generation circuit, an amplifier, a small-sized loudspeaker, and the like, and outputs various alarm sounds as required, such as key operation sounds during operations on various keys and the side trigger keys 5c of the input section 5 and a buzzer sound described further below.

The handy terminal structured as described above has, as an operation mode, a simultaneous read mode for reading a barcode and acquiring and storing its code data and for capturing an image of an arbitrary target having a barcode written or printed thereon and acquiring and storing its image data.

In the handy terminal, when the simultaneous read mode is set, images of a subject are captured by the camera section 28 at a predetermined frame rate, and the captured images are temporarily stored in the RAM 22 and sequentially displayed on the display 4 as a live view image. During that time, in the camera section 28, focus adjustment is performed by the AF function.

Figure 7:
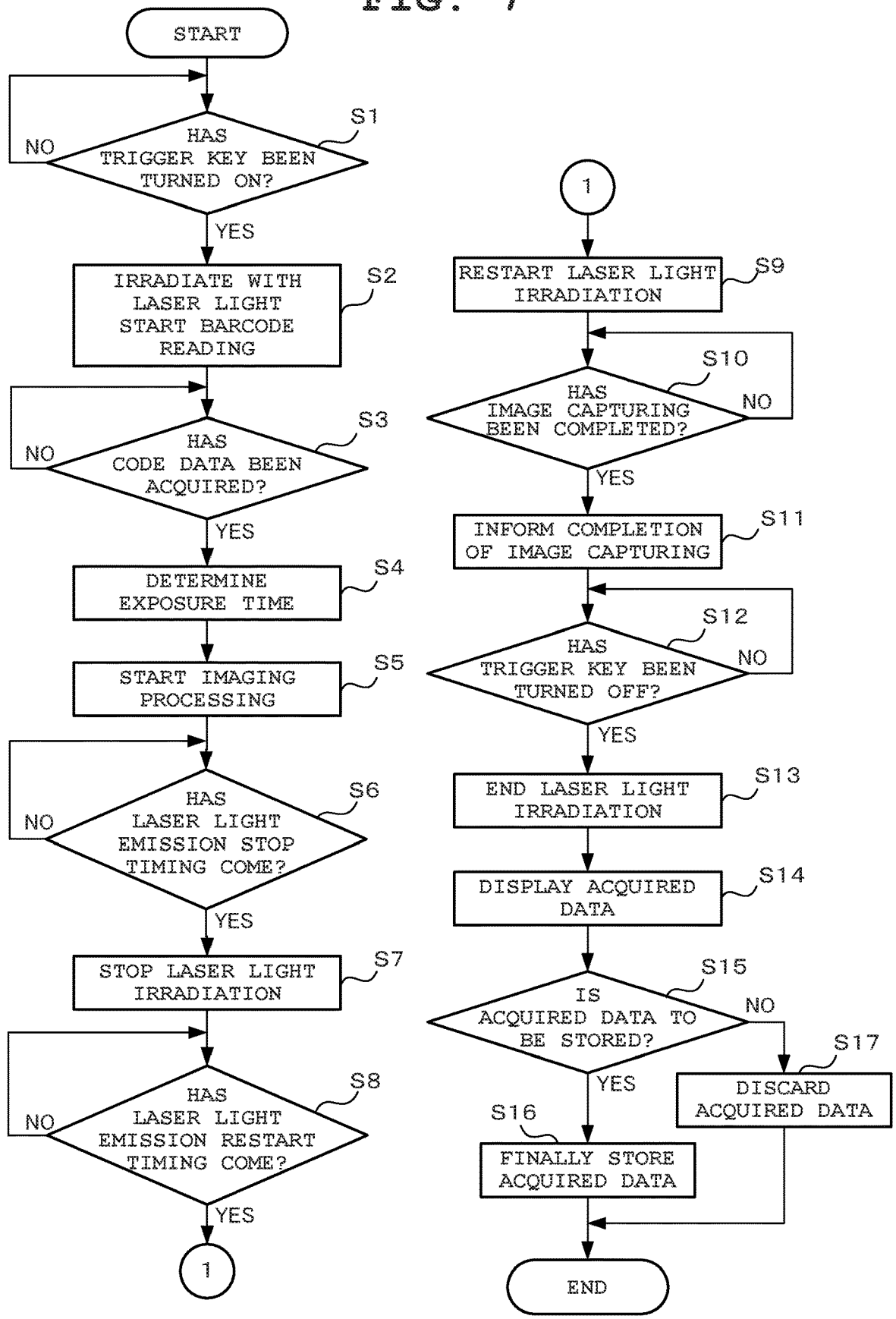
FIG. 7 is a flowchart of operations in a simultaneous read mode.

In the following descriptions, an operation of the handy terminal is described which is performed after the display of a live view image is started. FIG. 7 is a flowchart of the main portion of processing that is performed by the CPU 21 following the program stored in the main storage section 23 in response to an operation of selecting the simultaneous read mode.

As shown in FIG. 7, after the display of a live view image is started, the CPU 21 judges whether a trigger key (center trigger key 5b or one of the side trigger keys 5c) has become in an ON state, that is, whether a trigger key has been pressed by the user (worker) (Step S1).

Figure 9A:
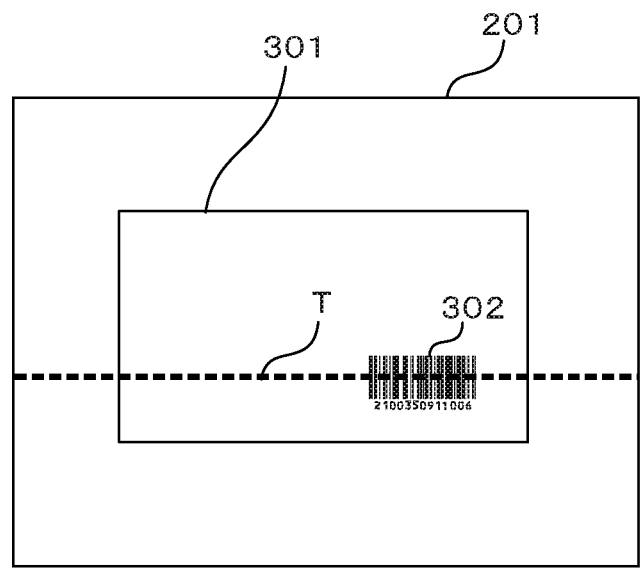
FIG. 9A and FIG. 9B are diagrams showing a difference between a live view image and a captured image.

FIG. 9A is a diagram showing an example of a live view image 201 that is displayed on the display 4 immediately before a trigger key is pressed by the user. This example shows the case in which a target having a barcode written or printed thereon is a slip. On the live view image 201, a light trail T of laser light is displayed together with a slip 301. That is, the user presses a trigger key with a photographing composition being adjusted such that the light trail T traverses a barcode 302 of the slip 301.

Then, when a trigger key is pressed to cause the trigger key to be in an ON state (YES at Step S1), the CPU 21 causes the scanner section 27 to start a barcode reading operation (Step S2). That is, the CPU 21 causes the scanner section 27 to start laser light irradiation, barcode scanning, and an operation of acquiring code data based on received reflected light.

Then, when code data is acquired (YES at Step S3), the CPU 21 determines an exposure time for capturing an image of the target based on the immediately preceding captured image (Step S4), and starts imaging processing (Step S5). That is, the CPU 21 sends an imaging start instruction to the camera section 28 together with information regarding the determined exposure time to cause the camera section 28 to start driving the image sensor 29 with a drive signal in accordance with the exposure time in the rolling shutter method.

After the image sensor 29 is started to be driven, the CPU 21 judges whether laser-light irradiation stop timing, that is, timing at which the light emission of the laser diode is stopped has come in the scanner section 27, based on the drive start timing of the image sensor 29 and the exposure time (Step S6). Then, when the irradiation stop timing comes (YES at Step S6), the CPU 21 causes the scanner section 27 to stop the light emission of the laser diode at this moment, that is, stops the laser light irradiation in the scanner section 27 (Step S7).

Subsequently, the CPU 21 judges whether laser-light irradiation restart timing, that is, timing at which the scanner section 27 is controlled to restart the light emission of the laser diode has come in the scanner section 27 (Step S8). Then, when the irradiation restart timing comes (YES at Step S8), the CPU 21 causes the scanner section 27 to restart the light emission of the laser light at this moment, that is, restarts the laser light irradiation in the scanner section 27 (Step S9).

Figure 8:
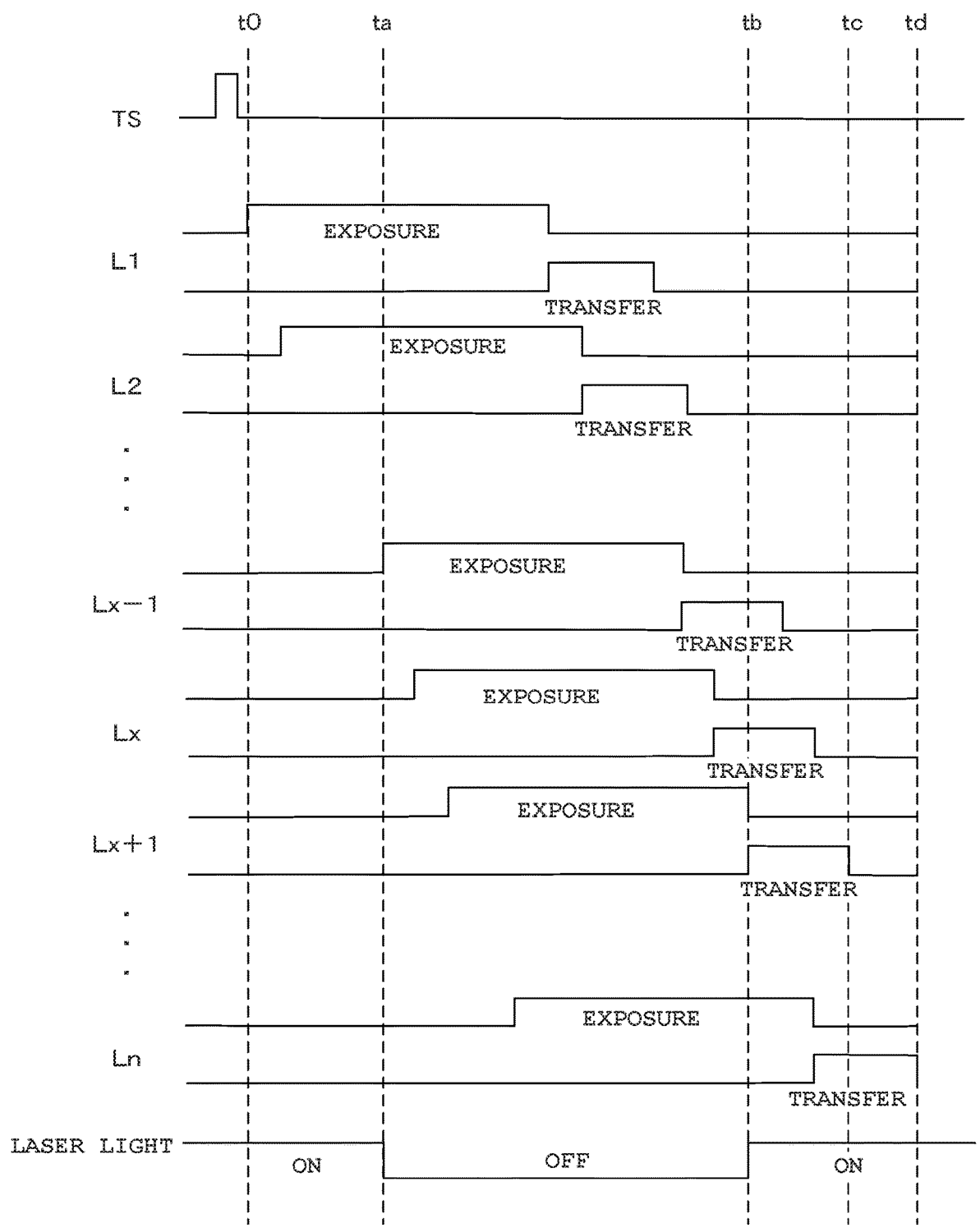
FIG. 8 is a timing chart of operations in the simultaneous read mode.

Here, details of the irradiation stop timing and the irradiation restart timing are described. FIG. 8 is a timing chart of operations in the simultaneous read mode. Specifically, FIG. 8 is a timing chart showing imaging start instruction timing TS, exposure start timing and charge read (transfer start) start timing for each of lines from a head line L1 to a last line Ln, and OFF timing and ON timing of laser light, that is, the above-described irradiation stop timing and irradiation restart timing.

As described above, since the image sensor 29 is driven with the rolling shutter method, the exposure start timing and the charge read (transfer start) start timing have a constant time deviation for each line.

The timing indicated by "ta" in FIG. 8 is the above-described irradiation stop timing. This irradiation stop timing ta is exposure start timing for a line Lx−1 immediately previous to (immediately above) a specific line Lx corresponding to the crossing position N of the light trail T of the laser light L in the imaging range 100 shown in FIG. 4. Also, the timing indicated by "tb" in FIG. 8 is the above-described irradiation restart timing. This irradiation restart timing tb is exposure end timing for a line Lx+1 immediately after (immediately below) the specific line Lx.

Figure 9B:
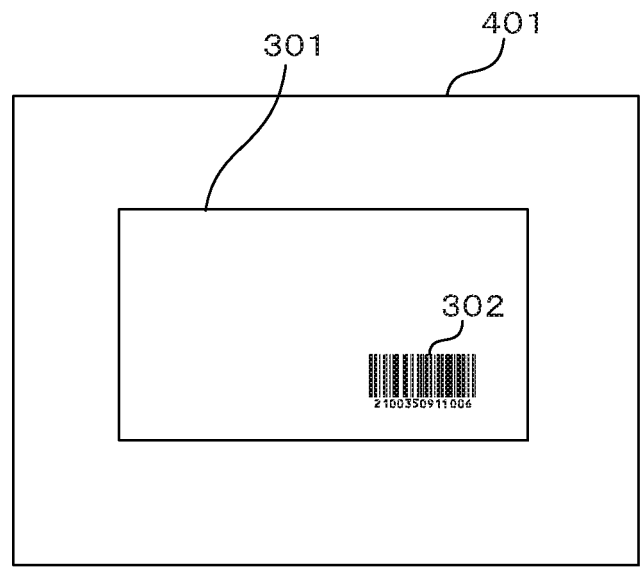

That is, during the driving of the image sensor 29, the CPU 21 temporarily stops the laser light irradiation in the scanner section 27 for the exposure periods for three lines, that is, the specific line Lx and two lines Lx−1 and Lx+1 before and after the specific line Lx. This can avoid reflections of the light trail T of the laser light in the captured image. Therefore, even if the live view image 201 with the light trail T of the laser light as shown in FIG. 9A is being displayed on the display 4 when the trigger key is pressed, a captured image 401 without the light trail T of the laser light can be acquired, as shown in FIG. 9B.

Then, when the imaging processing started at Step S5, that is, the image capturing of the target subject is completed (YES at Step S10), the CPU 21 causes the sound emission section 31 to output a buzzer sound to inform the user of the completion of the image capturing (Step S11).

Subsequently, the CPU 21 judges whether the trigger key becomes in an OFF state, that is, the pressed state of the trigger key has been released (Step S12). When the trigger key becomes in an OFF state (YES at Step S12), the CPU 12 causes the scanner section 27 to end the laser light irradiation (Step S13).

Next, the CPU 21 causes the data acquired in the above-described processing, that is, the acquired data formed of the code data read from the barcode 302 and the image data of the slip 301 to be displayed on the display 4 (Step S14). Note that in regard to the display mode of each acquired data on the display 4, any display mode can be adopted as long as the user can visually recognize the acquired data.

Then, for example, the CPU 21 causes the acquired data and an instruction request message to be displayed on the display 4, and thereby prompts the user to determine whether to store the acquired data being displayed (Step S15). When an instruction to store the acquired data is given (YES at Step S15), the CPU 21 stores the acquired data in the storage section 24 (Step S16), and ends the one processing in the simultaneous read mode.

When an instruction not to store the acquired data is given (NO at Step S15), the CPU 21 discards (deletes) the temporarily-stored acquired data from the RAM 22 (Step S17), and ends the one processing in the simultaneous read mode.

Note that the CPU 21 returns to Step S1 until the operation mode is changed by the user to a mode different from the simultaneous read mode or the power is turned OFF, and repeats the subsequent processing.

As described above, in the present embodiment, when the user uses the simultaneous read mode to read a barcode, a barcode reading operation and an imaging operation can be simultaneously performed by a trigger key being operated only once. Furthermore, a captured image in a favorable state without reflections of the light trail of laser light can be acquired as a captured image. That is, a favorable captured image can be acquired with workability when articles and ledger documents are managed being maintained.

In the present embodiment, the CPU 21 temporarily stops the laser light irradiation in the scanner section 27 for the exposure period for three lines, that is, the specific line Lx and two lines Lx−1 and Lx+1 before and after the specific line Lx, during the driving of the image sensor 29. In a more specific example, when 480 lines are taken as one frame exposure period, laser light irradiation for 3/480 frame exposure period, which is an exposure period for three lines, is stopped. However, the above-described number of lines is merely an example for convenience. At the time of implementation of the present invention, the number of lines is determined in accordance with a specific width of the light trail T of the laser light.

Here, in the present embodiment, the exposure period for three lines is taken as a period in which the laser light irradiation in the scanner section 27 is temporarily stopped. However, the period in which laser light irradiation is temporarily stopped is not limited thereto, and may be an exposure period and a transfer period (charge read period) for three lines. That is, the period may be from the irradiation stop timing ta to transfer end timing tc for the line Lx+1 immediately after (immediately below) the specific line Lx shown in FIG. 8.

Also, in the present embodiment, the laser light irradiation in the scanner section 27 is temporarily stopped when the image sensor 29 is being driven during the image capturing. However, the present invention is not limited thereto, and a configuration may be adopted in which laser light irradiation is temporarily stopped also during driving of the image sensor 29 before a trigger key is pressed, in a manner similar to that at the time of the image capturing.

Furthermore, a configuration may be adopted in which, when the image sensor 29 is being driven during image capturing, laser light irradiation in the scanner section 27 is temporarily stopped during the entire imaging operation period, that is, from the imaging start instruction timing TS to transfer end timing td for the last line Ln in FIG. 8. In this case as well, a captured image without the light trail of a laser light such as that shown in FIG. 9B can be acquired.

In the configuration where laser light irradiation in the scanner section 27 is temporarily stopped during an entire imaging operation period, the image sensor 29 can be driven not by the above-described rolling shutter method but by a global shutter method. Furthermore, this can be applied when a CCD (Charge Coupled Device) is used as the image sensor 29.

In the present embodiment, the structure has been described for convenience, in which the camera section 28 is controlled to perform an imaging operation at timing at which a barcode reading operation in the scanner section 27 is completed. However, a structure may be adopted in which the barcode reading operation and the imaging operation are literally concurrently performed by the scanner section 27 and the camera section 28.

While the present invention has been described with reference to the preferred embodiments, it is intended that the invention be not limited by any of the details of the description therein but includes all the embodiments which fall within the scope of the appended claims.

What is claimed is:

1. A barcode reading device comprising:
   a camera which captures a target positioned within a viewing angle of the camera and thereby acquires an image of the target;
   a scanner which is provided near the camera and which scans a barcode provided as a portion of the target with a light beam irradiated toward within the viewing angle of the camera, an irradiation width of the light beam being narrower than a width of the viewing angle, and thereby reads information from the barcode;
   a display which displays images captured of the target acquired by the camera; and
   a processor which performs processing operations including:
      an imaging control processing operation for controlling the camera to perform an imaging operation for acquiring an image for recording, using a rolling shutter method in which an exposure area is sequentially switched,
      a reading control processing operation for, while the camera is performing the imaging operation, controlling the scanner to perform a reading operation for reading information from the barcode, and
      an irradiation control processing operation for, when an exposure area corresponding to an area scanned with the light beam is exposed in the imaging operation, temporarily stopping the light beam irradiation by the scanner.

2. The barcode reading device according to claim 1, wherein the irradiation control processing operation restarts the light beam irradiation by the scanner when an exposure area being exposed by the imaging operation is switched from the exposure area corresponding to the area scanned with the light beam to another exposure area.

3. The barcode reading device according to claim 1, wherein the processing operations further include:
   a display control processing operation for controlling the display to perform a display operation in which, each time the camera acquires a new image by the imaging operation, an image to be displayed on the display is switched to the new image.

4. A barcode reading method executed by a barcode reading device including a camera which captures a target positioned within a viewing angle of the camera and thereby acquires an image of the target, a scanner which is provided near the camera and which scans a barcode provided as a portion of the target with a light beam irradiated toward within the viewing angle of the camera, an irradiation width of the light beam being narrower than a width of the viewing angle, and thereby reads information from the barcode, and a display which displays images of the target acquired by the camera, the method comprising:
   an imaging control process of controlling the camera to perform an imaging operation for acquiring an image for recording, using a rolling shutter method in which an exposure area is sequentially switched;
   a reading control process of, while the camera is performing the imaging operation, controlling the scanner to perform a reading operation for reading information from the barcode; and
   an irradiation control process of, when an exposure area corresponding to an area scanned with the light beam is exposed in the imaging operation, temporarily stopping the light beam irradiation by the scanner.

5. The imaging barcode reading method according to claim 4, process restarts the light beam irradiation by the scanner when an exposure area being exposed by the imaging operation is switched from the exposure area corresponding to the area scanned with the light beam to another exposure area.

6. The barcode reading method according to claim 4, further comprising:
   a display control process of controlling the display to perform a display operation in which, each time the camera acquires a new image by the imaging operation, an image to be displayed on the display is switched to the new image.

7. A non-transitory computer-readable storage medium having stored thereon a program that is executable by a computer of a barcode reading device including a camera which captures a target positioned within a viewing angle of the camera and thereby acquires an image of the target, a scanner which is provided near the camera and which scans a barcode provided as a portion of the target with a light beam irradiated toward within the viewing angle of the camera, an irradiation width of the light beam being narrower than a width of the viewing angle, and thereby reads information from the barcode, and a display which displays images of the target acquired by the camera, the program being executable by the computer to perform processing operations including:
   an imaging control processing operation for controlling the camera to perform an imaging operation for acquiring an image for recording, using a rolling shutter method in which an exposure area is sequentially switched,
   a reading control processing operation for, while the camera is performing the imaging operation, controlling the scanner to perform a reading operation for reading information from the barcode, and
   an irradiation control processing operation for, when an exposure area corresponding to an area scanned with the light beam is exposed in the imaging operation, temporarily stopping the light beam irradiation by the scanner.

8. The computer-readable storage medium according to claim 7, wherein the irradiation control processing operation restarts the light beam irradiation by the scanner when an exposure area being exposed by the imaging operation is switched from the exposure area corresponding to the area scanned with the light beam to another exposure area.

9. The computer-readable storage medium according to claim 7, wherein the processing operations further include:
   a display control processing operation for controlling the display to perform a display operation in which, each time the camera acquires a new image by the imaging operation, an image to be displayed on the display is switched to the new image.

* * * * *

UNITED STATES PATENT AND TRADEMARK OFFICE
CERTIFICATE OF CORRECTION

PATENT NO. : 10,565,412 B2
APPLICATION NO. : 16/129750
DATED : February 18, 2020
INVENTOR(S) : Yasuaki Ogawa It is certified that error appears in the above-identified patent and that said Letters Patent is hereby corrected as shown below:

In the Claims

Column 8, Line 48, Claim 1, Line 11, after "images" delete "captured".

Column 9, Line 36, Claim 5, Line 1, before "barcode" delete "imaging".

Column 9, Line 37, Claim 5, Line 2, after "claim 4," insert --wherein the irradiation control--.

Signed and Sealed this
Twenty-second Day of September, 2020

Andrei Iancu
*Director of the United States Patent and Trademark Office*